United States Patent [19]
Achenbach

[11] Patent Number: 6,106,191
[45] Date of Patent: Aug. 22, 2000

[54] LOADING DOCK LEVELER WITH PRECAST BASE BOX INSERT

[76] Inventor: R. Timothy Achenbach, 120 Gelsinger Rd., Sinking Springs, Pa. 19608

[21] Appl. No.: 09/170,872

[22] Filed: Oct. 13, 1998

[51] Int. Cl.[7] .............................. E01D 1/00; B65G 69/24
[52] U.S. Cl. ...................... 404/71.1; 404/71.3; 404/77.1
[58] Field of Search ..................... 14/96.5, 71.1, 14/71.3, 77.1; 52/169.7

[56] References Cited

U.S. PATENT DOCUMENTS

| | | | |
|---|---|---|---|
| 3,327,335 | 6/1967 | Beckwith et al. | 14/71.3 |
| 3,335,442 | 8/1967 | Kumpolt | 14/71.3 |
| 4,110,860 | 9/1978 | Neff et al. | 14/71.7 |
| 4,118,817 | 10/1978 | Burnham | 14/71.3 |
| 4,570,277 | 2/1986 | Hahn et al. | 14/71.3 |
| 4,928,340 | 5/1990 | Alexander | 14/71.3 |
| 5,442,825 | 8/1995 | Hahn et al. | 14/71.1 |

Primary Examiner—James A. Lisehora
Attorney, Agent, or Firm—Duane, Morris & Heckscher LLP

[57] ABSTRACT

A loading dock leveler is mounted in a dock slab by pre-casting and placing a four sided monolithic concrete box insert defining a bottom, two lateral side walls, a rear wall and an open front above the bottom and between the side walls, to provide a dock leveler pit. The remainder of the dock slab is poured around the precast box insert. Before or after placing and embedding the precast box insert, a leveler platform, base and extension mechanism are installed. An angle iron or other internal fixture can be embedded in the box insert during casting to provide a welding point for affixing one or both of a hinge leaf for the platform and a base of the leveler mechanism. The box insert also is provided with external protrusions such as a tenon-like bead protruding outwardly from the side and rear walls. When the slab is poured around the box insert, the tenon like protrusion engages mechanically in the slab as the pour cures.

20 Claims, 4 Drawing Sheets

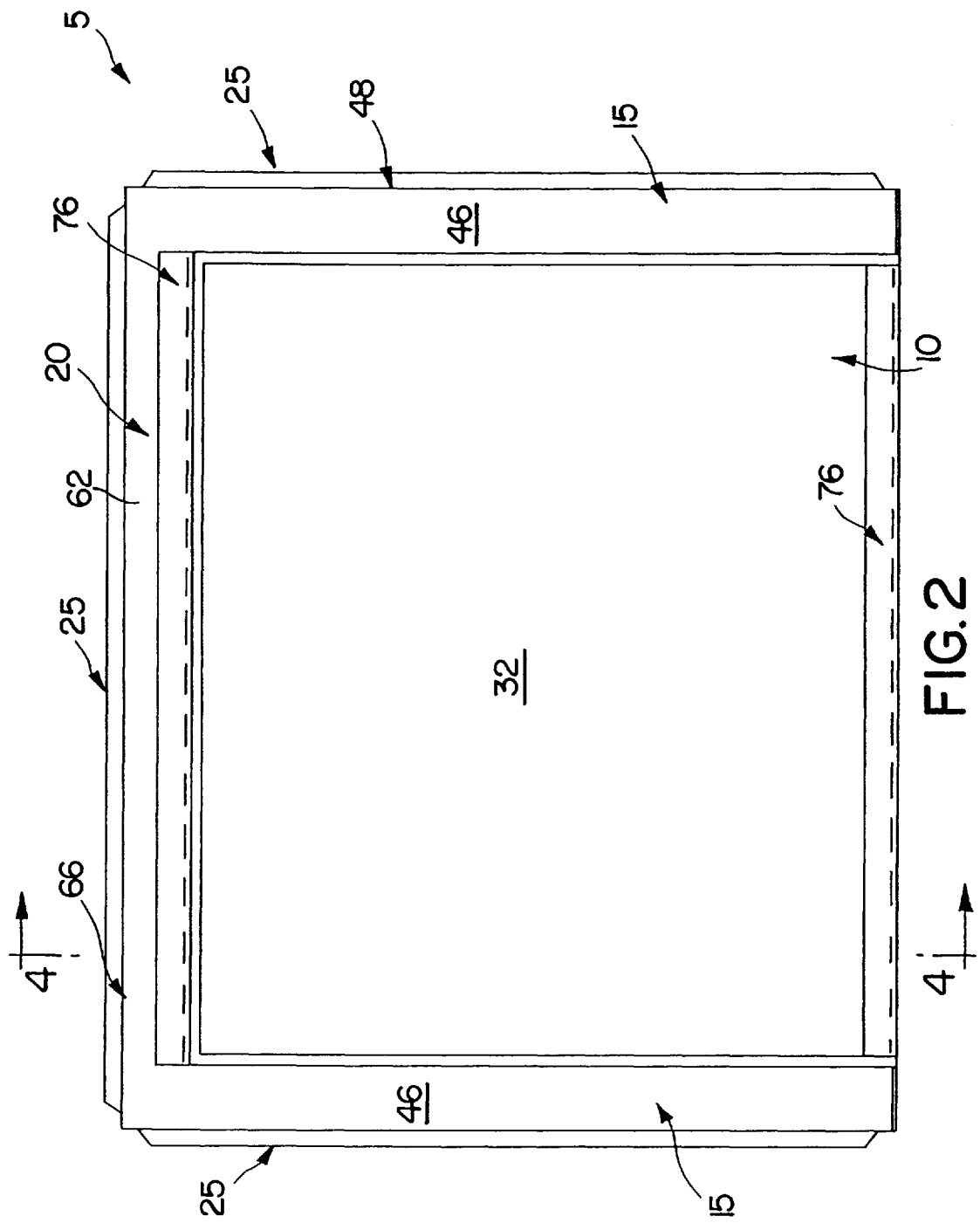

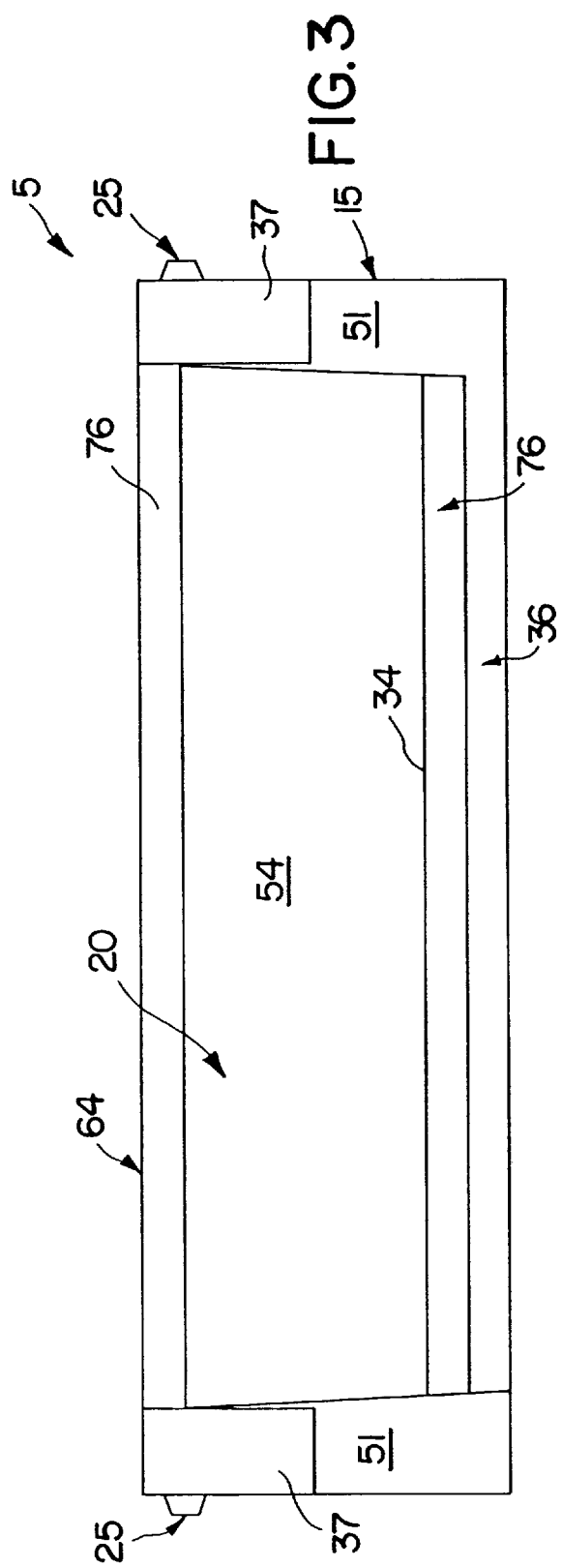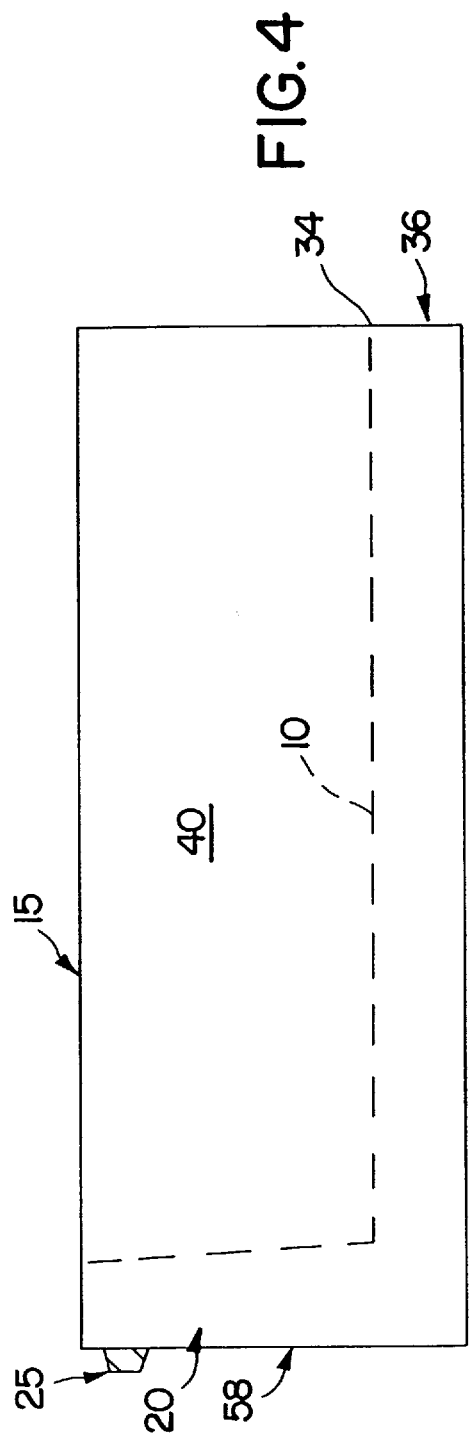

LOADING DOCK LEVELER WITH PRECAST BASE BOX INSERT

BACKGROUND OF THE INVENTION

1. Field of the Invention

The invention relates to the construction and installation of a loading dock leveler, namely a pivotable platform for bridging between the different elevations of a loading dock slab or similar structure, and a vehicle cargo bed. In particular, a loading dock leveler mechanism is mountable in a precast concrete box insert that has facilities for attachment of the mechanism and for engagement with a poured concrete slab forming the balance of the loading dock or other floor or platform.

2. Prior Art

A loading dock provides a surface for loading and unloading cargo and the like from an elevation substantially equal to that of the cargo bed of a vehicle, for example, a semitrailer, railroad car, etc. Unfortunately, the cargo beds of vehicles are not all at the same elevation. When a truck backs up to a loading dock there is often a step up or down from the dock to the cargo bed or vice versa. The step interferes with loading and unloading, and can be a trip hazard as well as an obstruction that makes it difficult to slide or roll cargo, a handtruck or another vehicle from one elevation to the other. To solve this problem, a dock leveler can be provided and positioned so that the forward edge of a movable platform rests on the cargo bed and provides a ramp forming a stepless transition between the two elevations.

A loading dock leveler typically comprises a mechanism mounted in an indentation or pit on the top of a loading dock or other slab, floor or similar structure. A typical loading dock or slab has a horizontal surface at a given elevation and a vertical front face. The indentation opens upwardly and forwardly at the vertical front face of the loading dock or slab. The mechanism includes a movable platform that is hinged on a horizontal axis at the upper rear edge of the indentation or pit. Powered means are provided for pivoting the platform up or down from a position at which the platform is flush with the surface of the slab. The powered means can be a pneumatic or hydraulic cylinder, an inflatable body or a motor, etc., bearing between the bottom of the indentation and the underside of the movable platform.

Examples of dock levelers are disclosed, for example, in U.S. Pat. No. 4,110,860—Neff et al.; U.S. Pat. No. 4,570,277—Hahn et al.; U.S. Pat. No. 4,928,340—Alexander; and U.S. Pat. No. 5,442,825—Hahn et al. Each of these examples includes a movable platform that advantageously fits closely in an indentation. Any gap between the platform and the edges of the indentation at either side provides a path for material to drop below the platform and rest in the indentation where it potentially can interfere with positioning of the platform. Such material may be difficult or dangerous to remove. The gap also allows ingress for dirt and water. Collapsible vertical side skirts are provided in Neff and Alexander to block material from passing horizontally under the platform when the platform is raised above the surface of the dock slab. In Hahn '825, a compressible edge seal protrudes horizontally to engage against the side walls of the indentation. The seal corrects for a gap between the platform and the dock slab, but only when the platform is lowered below the surface of the slab and into the indentation.

Loading dock slabs are constructed to receive leveler mechanisms, i.e., the loading dock slab is provided with an indentation during construction. If the indentation is not provided when the slab is built, a section of the slab must be demolished and rebuilt to retrofit a leveler mechanism. Building a slab with an indentation involves building forms of the necessary size to complement the dimensions of the mechanism, pouring the slab around the forms and smoothing the horizontal surface of the indentation to make a smooth rectilinear pit.

Leveler mechanisms typically include a frame that is adapted to rest on the bottom of the indentation or pit. Angle iron bars can be set around the perimeter edges of the indentation, either being parts of the leveler frame or independently mounted. Preferably such angle iron bars are inset when forming the slab so as to be flush with the slab horizontal surface as well as with the vertical side walls of the pit. Similarly, an angle iron bar which can be separate or part of the base frame overlaps the front edge of the indentation, extending downward over the front wall of the dock. In Hahn '277, the frame also includes angle iron sections that rest against the side walls at the lower corners of the pit, presumably protecting against rocking of the movable platform. Finally, resilient bumpers are mounted on the vertical front face of the dock slab so that a truck can be backed to a fixed position relative to the dock slab.

A dock leveler is preferably a robust structure. However, it would be advantageous if the dimensions of the dock leveler could also be more positionally accurate and precise. What is needed is a way to improve the fit and alignment of the leveler mechanism with the walls of the pit, and to do so without relying on the already considerable craftsmanship needed to form the indented dock slab.

SUMMARY OF THE INVENTION

It is an object of the invention to provide a previously cast concrete box insert for a dock slab, the box insert having a bottom and three side walls, and to embed the box insert into a dock slab for defining the pit of a dock leveler.

It is a further object to minimize the construction craftsmanship needed when pouring a dock slab while defining a leveler pit.

It is another object to provide an box insert as described with embedded fastener features to which the leveler mechanism can be attached.

It is also an object to provide external fastener features on the box insert for convenient attachment of the leveler mechanism, bumpers and the like as well as to cause the precast box insert mechanically to engage with concrete poured and cured around the box insert after it has been placed.

It is also an object to build such box inserts at an off-site manufacturing facility at which jigs, positioners and similar fixtures are available to maintain high dimensional tolerances for at least the inside surfaces of the box insert and the fastener features associated with the box insert.

These and other objects are accomplished by a loading dock leveler mounted in a dock slab by pre-casting and placing a four sided monolithic concrete box insert defining a bottom, two lateral side walls, a rear wall and an open front above the bottom and between the side walls, to provide a dock leveler pit. The remainder of the dock slab is poured around the precast box insert. Before or after placing and embedding the precast box insert, a leveler platform, base and extension mechanism are installed. An angle iron or other internal fixture can be embedded in the box insert during casting to provide a welding point for affixing one or both of a hinge leaf for the platform and a base of the leveler mechanism. The box insert also is provided with external protrusions such as a tenon-like bead protruding outwardly from the side and rear walls. When the slab is poured around the box insert, the tenon-like protrusion engages mechanically in the slab as the pour cures.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 2 is a top plan view of the dock-leveler insert shown in FIG. 1;

FIG. 3 is a front elevational view of the dock-leveler insert shown in FIG. 1;

FIG. 4 is a side sectional view of the pre-cast dock-leveler insert shown in FIG. 1, as taken along line 4—4 in FIG. 2.

DETAILED DESCRIPTION OF THE PREFERRED EMBODIMENT

The following description of the preferred embodiments of the invention are intended to be read in connection with the foregoing drawings and are to be considered a portion of the entire written description of this invention. As used in this description, the terms "horizontal", "vertical", "left", "right", "up", and "down", as well as adjective and adverb derivatives thereof (e.g., "horizontally", "rightwardly", "upwardly", etc.) refer to the orientation of the structure of the invention as it is illustrated in the particular drawing figure. Similarly, the terms "inwardly " and "outwardly" generally refer to the orientation of a surface relative to its axis of elongation, or axis of rotation, as appropriate. Also, the terms "connected" and "interconnected", when used in this disclosure to describe the relationship between two or more structures, and means that such structures are secured or attached to each other either directly or indirectly through intervening structures, and includes pivotal connections. The term "operatively connected" means that the foregoing direct or indirect connection between the structures allows such structures to operate as intended by virtue of such connection.

Figure 1:
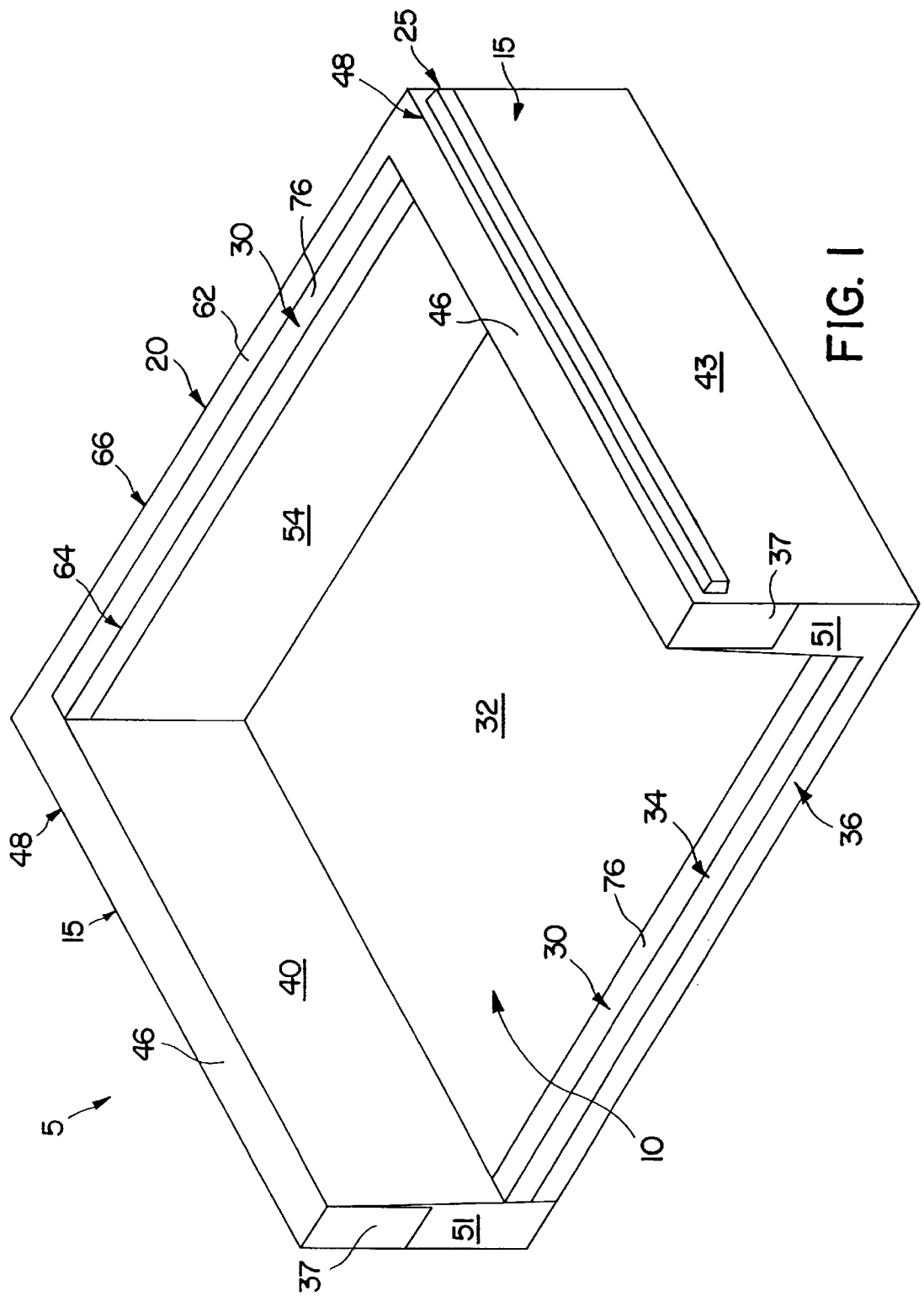
FIG. 1 is a perspective view of a pre-cast dock-leveler insert formed in accordance with the present invention.

Referring to FIG. 1, dock-leveler insert 5 includes a bottom 10, two lateral sidewalls 15, a rear wall 20, a tenon-like bead 25, and attachment fixtures 30. More particularly, bottom 10 comprises a generally rectangularly shaped, substantially flat inner surface 32 and an open front edge 34 and front face 36. Bottom 10 has about a 0.25 to 0.75 inch sloping grade over about a five foot depth from the rear wall to open front edge 34, so that liquids and debris that become trapped in dock-leveler insert 5 naturally tend to drain out. In a preferred embodiment the slope is 0.5 inch over five feet, three inches depth and the pit has a height of about twenty inches.

Lateral side walls 15 include an inner surface 40, an outer surface 43, a top surface 46, and a front surface 51. Outer surface 43 and top surface 46 intersect to form an upper edge 48. Lateral side walls 15 are generally rectangular in shape, but with a slightly tapered cross-section so that the portion of inner surface 40 of each side wall 15 that is adjacent to inner surface 32 of bottom 10 projects inwardly (FIG. 3). This taper creates a draft for ease in releasing dock-leveler insert 5 from its mold. The taper also provides for added structural strength and rigidity. Each lateral sidewall 15 also includes a front surface 51 that is generally coplanar with open front edge 34 and front face 36. Front surface 51 also may include fastening means 37 for fastening rubber bumpers or the like, such as, bolts or bolt holes, etc., or weld plates for a bumper mounting base (not shown).

Rear wall 20 comprises an inner surface 54, an outer surface 58, and a top surface 62. Top surface 62 intersects with inner surface 54 and outer surface 58 to form a top inner edge 64 and a top outer edge 66. Rear wall 20 is also generally rectangular in shape, with a slightly tapered cross-section so that the portion of inner surface 54 that is adjacent to inner surface 32 of bottom 10 projects inwardly (FIG. 4). This taper again creates a draft for ease in releasing dock-leveler insert 5 from its mold, and provides for added structural strength and rigidity.

Referring to FIGS. 1 and 2, tenon-like bead 25 protrudes outwardly from outer surfaces 43 of lateral side walls 15 and outer surface 58 of rear wall 20. Preferably, tenon-like bead 25 is spaced below, and in parallel relation to upper edge 48 of lateral sidewalls 15 and outer top edge 66 of rear wall 20. Tenon-like bead 25 has a polygonal cross-sectional shape, e.g., trapezoidal, rectangular, etc.

Figure 5:
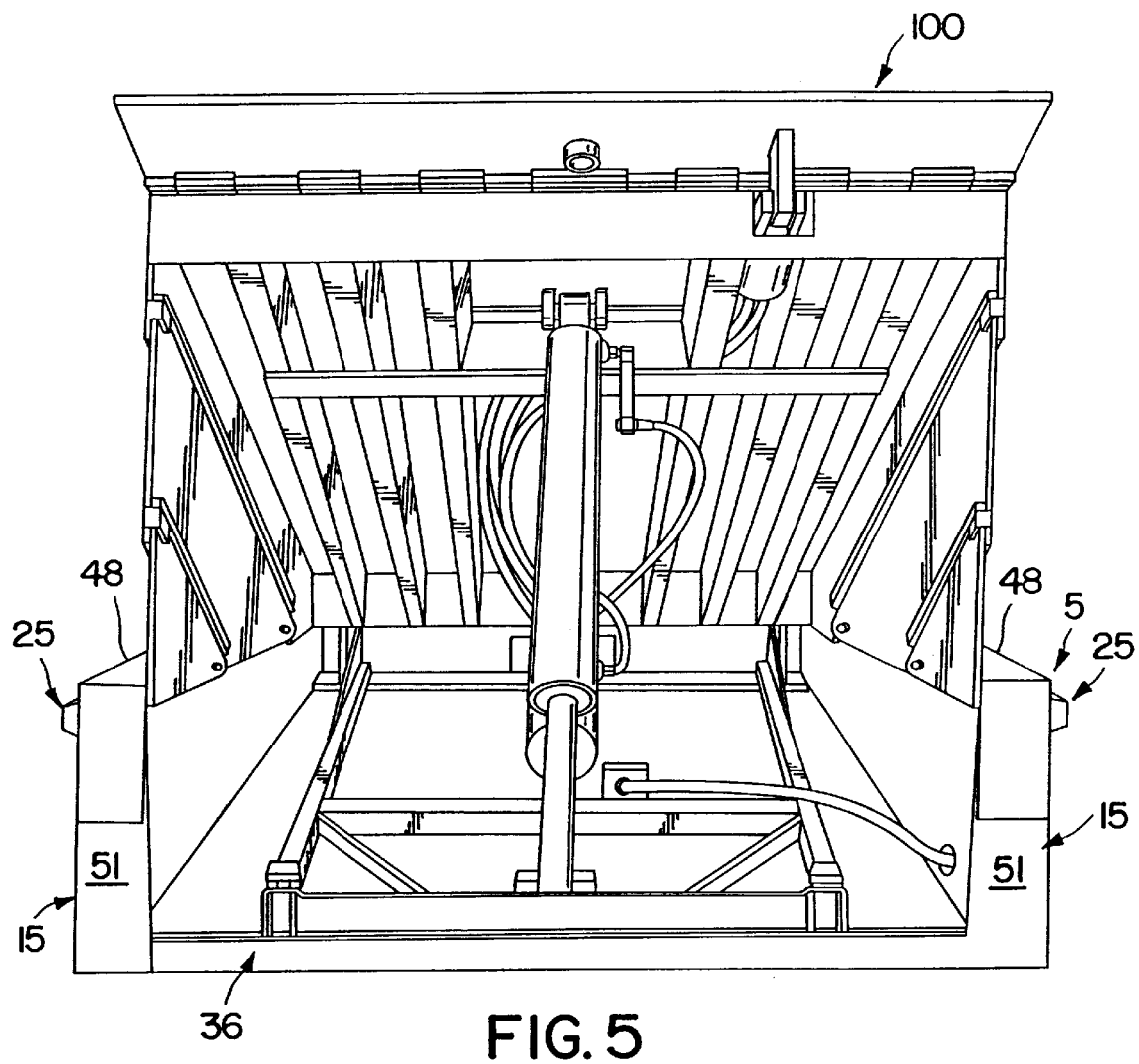
FIG. 5 is a perspective view of the pre-cast dock-leveler insert with an exemplary leveler mechanism mounted therein.

Referring to FIGS. 1–3, attachment fixtures 30 comprise metal bars e.g., angle iron 76, embedded in bottom 10, at open front edge 34, and in rear wall 20, at inner top edge 66. These attachment fixtures are selected from a variety of well known metals that are suitable for welding a corresponding metal hinge or the like of a standard leveler mechanism platform (FIG. 5).

Preferably dock-leveler insert 5 is poured as a "monolithic" casting, preferably formed from Portland cement and aggregate mix having 3% to 5% entrained air, preferably 4%. This entrained air creates microscopic bubbles that allow for proper expansion/contraction during seasonal freeze/thaw cycles. The concrete preferably has a 5,000 pound compression strength.

Dock-leveler insert 5 preferably is steel reinforced with 0.5 inch deformed rebar, tied on 12 inch centers. The attachment fixtures are anchored by attachment to the rebar or by anchors such as 1 inch by 0.25 inch steel flat stock, 8 to 10 inches long with an L-bend at one the embedded end for anchoring within bottom 10 and sidewalls 15.

The mold for casting the dock leveler insert is arranged such that the insert is cast upside down. The mold preferably has accommodations to hold angle irons, bumpers, etc., so that the same are correctly position and may be fastened to dock-leveler insert 5 by embedding a portion of such devices or anchors connected thereto, during casting. Whereas casting is done with the mold in upside-down with respect to the normal orientation of dock-leveler insert 5, only a perimeter and one mold part for the inner walls are needed so that the mold essentially comprises a core plus an outside shell. The reinforcing rebar and the attachment fixtures are positioned in the space between the core and the shell, and concrete mix is poured thereon and smoothed on the surface (which will become the underside of bottom 10 of the insert) using a float. The insert is thoroughly cured and can be lifted free of the mold.

The insert may weigh several thousand pounds. However, it is small enough to be manipulated, transported and positioned, for example using a forklift. Lifting eyes (not shown) can facilitate such operations.

A loading dock, including a dock-leveler insert, may be formed by first casting a four sided box as shown to form dock-leveler insert 5. The four sided box defines a bottom, two lateral side walls, a rear wall and an open front above the bottom and between the side walls. The bottom, side walls and rear wall are of integrally cast or monolithic concrete defining a pit dimensioned to receive dock-leveler mechanism 100. The inside of the pit is very accurate and repeatably dimensioned because it corresponds to the dimensions of the core used in casting.

The box insert is supported, for example on footings or a lower cast part of the loading dock slab, so as to be flush with an intended upper surface of the loading dock. Concrete is poured around the box insert to form a dock slab that meets flush with the upper edge of insert 5. As mentioned above, the casting of dock-leveler insert 5 includes forming tenon-like bead 25 as an external protrusion projecting outwardly from outer surfaces 43, 58 of sidewalls 15 and rear wall 20. The pouring includes encompassing the tenon-like bead protrusion 25 with poured concrete such that dock-leveler insert 5 and the dock slab are mechanically engaged when the concrete forming the slab around the insert is cured. Thus when the concrete of the slab is allowed to cure, the dock-leveler insert 5 is securely embedded therein.

Dock-leveler mechanism 100 preferably comprises a platform hinged on a base, arranged so that at least one of the platform hinge and the base is available for attaching to dock-leveler insert 5. Also, at least one metal bar can be embedded in the dock-leveler insert 5 and anchored so that, when dock-leveler mechanism 100 is attached to the insert, at least one of the platform and the base are affixed to the anchored metal bar. In one embodiment, a first angle iron is embedded in an upper forward edge of rear wall 20 of dock-leveler insert 5 during casting. A second angle iron is also embedded in a front edge of bottom 10 during casting. The platform and the base are affixed, via conventional welding methods, to the first and second angle irons, respectively.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A cast concrete insert for a dock leveler to be mounted in a dock slab, comprising:

a four sided box insert defining a bottom, two lateral side walls, a rear wall and an open front above the bottom and between the side walls, wherein the bottom, side walls and rear wall are integrally cast concrete;

an internal metal fixture for attachment of a dock leveler platform for pivoting on a horizontal axis adjacent to the rear wall; and, an external protrusion extending outwardly from an outer surface of at least one of the bottom, sidewalls and rear wall, whereby the box insert can be mechanically engaged in concrete poured around the box insert in forming the dock slab.

2. The insert of claim 1, wherein the internal metal fixture comprises a bar embedded in the rear wall adjacent to a top edge of the rear wall, whereby the bar can receive a weld for attaching a hinge of the leveler platform.

3. The insert of claim 2, wherein the bar comprises an angle iron embedded in and extending around a top inward edge of the rear wall.

4. The insert of claim 3, further comprising at least one additional embedded metal plate positioned at one of a front edge of the bottom and a front face of one of the side walls.

5. The insert of claim 1, wherein the external protrusion comprises at least one elongated bead protruding parallel to and spaced below an upper edge of one of the side walls and rear wall.

6. The insert of claim 5, wherein the side and rear walls have vertical outer surfaces and inner surfaces that are inclined outwardly, and wherein the bottom slopes downwardly from back to front.

7. The loading dock leveler of claim 5, wherein the side and rear walls have vertical outer surfaces and inner surfaces that are inclined, and wherein the bottom slopes downwardly from back to front.

8. A loading dock leveler for mounting in a dock slab, comprising:

a four sided box insert defining a bottom, two lateral side walls, a rear wall and an open front above the bottom and between the side walls, wherein the bottom, side walls and rear wall are integrally cast concrete;

an internal metal fixture attached adjacent to the rear wall;

a dock leveler platform attached to the internal metal fixture via a hinge mechanism for pivoting the platform on a horizontal axis adjacent to the rear wall;

an external protrusion extending outwardly from an outer surface of at least one of the bottom, sidewalls and rear wall, whereby the box insert can be mechanically engaged in concrete poured around the box insert in forming the dock slab; and, a powered mechanism bearing between the box insert and the platform at a space from the horizontal axis.

9. The loading dock leveler of claim 8, wherein the internal metal fixture comprises a bar embedded in the rear wall adjacent to a top edge of the rear wall, to which a hinge of the leveler platform is attached by at least one of a weld, a fastener and an integral connection.

10. The loading dock leveler of claim 9, wherein the bar comprises an angle iron embedded in and extending around a top inward edge of the rear wall.

11. The loading dock leveler of claim 10, further comprising at least one additional embedded metal plate positioned at one of a front edge of the bottom and a front face of one of the side walls.

12. The loading dock leveler of claim 10, further comprising a metal plate embedded at a front edge of the bottom and wherein the powered mechanism is attached to the metal plate at the front edge by one of a weld, a fastener and an integral connection.

13. The loading dock leveler of claim 8, wherein the external protrusion comprises at least one elongated bead protruding parallel to and spaced below an upper edge of one of the side walls and rear wall.

14. A method for constructing a loading dock including a dock leveler, comprising the steps of:

casting a four sided box insert defining a bottom, two lateral side walls, a rear wall and an open front above the bottom and between the side walls, wherein the bottom, side walls and rear wall are integrally cast concrete defining a pit dimensioned to receive the dock leveler;

supporting the box insert flush with an intended upper surface of the loading dock;

pouring concrete around the box insert to form a dock slab and allowing the concrete to cure such that the box insert is embedded therein.

15. The method of claim 14, wherein the dock leveler comprises a platform and a base, and further comprising attaching at least one of the platform and the base to the box insert.

16. The method of claim 14, comprising embedding at least one metal bar in the box insert and wherein said attaching includes affixing said at least one of the platform and the base to the metal bar.

17. The method of claim 16, comprising embedding a first angle iron in an upper forward edge of the rear wall during said casting and embedding a second angle iron in a front edge of the bottom during said casting, and wherein said attaching includes affixing the platform and the base to the first and second angle irons, respectively.

18. The method of claim 16, wherein said attaching comprises welding said at least one of the platform and the base to the metal bar.

19. The method of claim 14, wherein said casting includes forming an external protrusion extending outwardly from an outer surface of at least one of the bottom, sidewalls and rear wall, and said pouring includes encompassing the protrusion with poured concrete such that the box insert and the dock slab are mechanically engaged.

20. A loading dock, comprising:

a four sided precast box insert defining a bottom, two lateral side walls, a rear wall and an open front above the bottom and between the side walls, wherein the bottom, side walls and rear wall are integrally cast concrete;

a slab poured around the precast box insert;

a dock leveler platform attached at a proximal end of the platform to the precast box insert via a hinge mechanism for pivoting the platform substantially on a horizontal axis adjacent to the rear wall; and, an extensible mechanism bearing between the box insert and the platform at a space from the horizontal axis, for setting a vertical elevation of a free end of the platform opposite from said proximal end.

* * * * *